United States Patent [19]

Suzuki et al.

[11] 3,869,298

[45] Mar. 4, 1975

[54] IRON OXIDE PIGMENTS AND PROCESS FOR THE PRODUCTION THEREOF

[75] Inventors: Morio Suzuki, Koube; Masayoshi Tachibana, Ikeda; Takayoshi Moriai, Takatsuki, all of Japan

[73] Assignee: Teikoku Kako Co., Ltd., Osaki-shi, Japan

[22] Filed: Nov. 13, 1972

[21] Appl. No.: 305,987

[30] Foreign Application Priority Data

Nov. 12, 1971 Japan.............................. 46-89786

[52] U.S. Cl. ............................ 106/304, 106/308 B
[51] Int. Cl. ............................................... C09c 1/24
[58] Field of Search ................ 106/291, 304, 308 B

[56] References Cited
UNITED STATES PATENTS

| | | | |
|---|---|---|---|
| 2,989,411 | 6/1961 | Suchow | 106/304 |
| 3,086,877 | 4/1963 | Sheehan et al. | 106/308 |
| 3,087,828 | 4/1963 | Linton | 106/291 |

*Primary Examiner*—Delbert E. Gantz
*Assistant Examiner*—John P. Sheehan
*Attorney, Agent, or Firm*—William Anthony Drucker

[57] ABSTRACT

This invention relates to an iron oxide pigment consisting essentially of synthetic micaceous iron oxide rich in relfected light and a coating of a transparent metal oxide (including a hydrated oxide) having a high refractive index, such as titanium dioxide and zirconium dioxide. Various properties of the surfaces of synthetic micaceous iron oxide can be improved by the coating of the above metal oxide and various clear colors of a beautiful metallic luster can be manifested. Accordingly, the iron oxide of this invention can be used for preparation of various paints, plastics and articial stones. This invention also relates to a process for the preparation of such iron oxide pigment.

12 Claims, 4 Drawing Figures

IRON OXIDE PIGMENTS AND PROCESS FOR THE PRODUCTION THEREOF

SUMMARY OF THE INVENTION

This invention relates to an iron oxide pigment and a process for the preparation thereof, and a primary object of this invention is to provide a novel iron oxide pigment which is suitable for compounding into various paints, synthetic resins, construction materials and the like, and an appropriate process for the preparation of such iron oxide pigment.

Synthetic micaceous iron oxide (hereinafter referred to merely as "synthetic MIO") is flaky α-iron oxide which was industrially produced for the first time in the world by us, and processes for preparing such iron oxide are specifically proposed in Japanese Patent Applications Nos. 86581/70, 89791/70 and 89792/70, ect. Characteristic properites of synthetic MIO prepared by these processes are summarized below.

a. Synthetic MIO is an iron oxide of high purity

Since synthetic MIO undergoes purification during the manufacture steps, even if a waste iron salt of a low grade such as iron sulfate produced as a by-product in preparation of titanium dioxide is used as the starting material, a purity of at least 99% as measured as $Fe_2O_3$ is guaranteed. Especially when a starting material of a relatively good quality such as iron sulfate obtained from the waste liquor coming from the step of the pickling of steel, a purity of at least 99.8% is guaranteed.

b. In synthetic MIO, the particle sizes can be controlled appropriately and the particle size distribution is within a narrow range.

Synthetic MIO is composed of flaky single crystal particles, and the average particle size can be optionally varied within a range of from about 1 to about 60 μ by changing the manufacturing conditions. Further, in synthetic MIO, the particle size distribution is within a very narrow range and particles are very uniform in size. The particles have a hexagonal to quasi-hexagonal flaky form, and the size-to-thickness ratio in particles is within a range of from 10 : 1 to 30 : 1, with a tendency that particles of a greater size have a smaller relative thickness.

c. Optical properites

The plate-like surface of the single crystal particle of synthetic MIO is very smooth, and under the observation of a scanning electron microscope it was confirmed that the single crystal particle of synthetic MIO has an excellent optical plane. In addition, α-iron oxide (α-$Fe_2O_3$)α constituting the crystal structure of synthetic MIO has a refractive index $n$ of 3.0, which is greater than the refractive index $n$ of 2.42 of diamond; therefore, the plate-like surface of the single crystal particle of synthetic MIO exhibits a high reflexibility, and synthetic MIO powder has a glistening appearance tinged with a metallic luster.

d. Chemical resistance and heat resistance

Synthetic MIO exhibits a higher resistance against such chemicals as acids and alkalis than ordinary pigments, and it is almost inactive chemically. Further, even when synthetic MIO is heated at such a high temperature as 1,000°C., any ignition loss is hardly observed and no sintering is observed among particles. This property is characteristic of synthetic MIO by which it can be clearly distinguished from so-called red iron oxide.

As regards synthetic MIO having such characteristics, uses have heretofore been developed in the fields of anticorrosive paints, metallic paints, heat resistant paints, plastics, artifical stones, anisotropic ferrites, etc. In these applications, however, synthetic MIO has been found to have the following defects a. When synthetic MIO is used in a paint, it involves some problems concerning wetting with a binder and adhesion of a coating film.

b. In some cases where synthetic MIO is used as a filter, especially for a polyvinyl chloride resin, it is not usable since iron oxide acts as a decomposition catalyst for the resin.

c. Since synthetic MIO has only a dark purple color tinged with a metallic luster, its use is limited.

SUMMARY OF THE INVENTION

It has now been found that when the surface of synthetic MIO having the above-mentioned characteristics and defects is coated with a metal oxide being chemically inactive and having a high refractive index, such as titanium dioxide, the above defects can be overcome and it is possible to obtain synthetic MIO products varying in the color.

BRIEF DESCRIPTION OF THE DRAWINGS

The drawings are given to compare embodiments of this invention with conventional techniques, wherein.

DETAILED DESCRIPTION OF THE INVENTION

Figure 1:
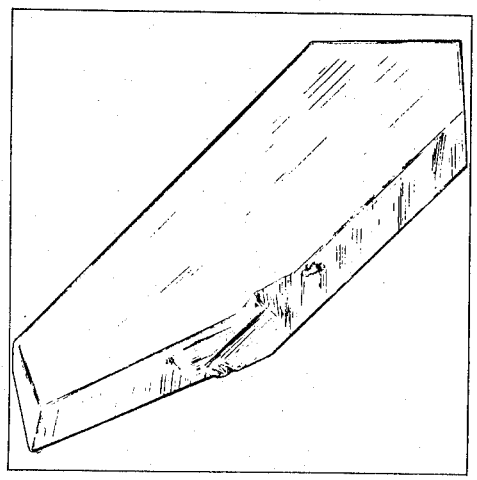
FIG. 1 is a photograph of synthetic MIO taken under a scanning electron microscope (magnification 10,000 x)

The plate-like surface of the single crystal particle of synthetic MIO is excellent in smoothness, and as is illustrated in the photograph of FIG. 1 taken under a scanning electron microscope, an excellent optical plane is formed in the single crystal particle of synthetic MIO. As is apparent from comparison of this optical plane of synthetic MIO with that of natural MIO shown in FIG. 2, even though both the substances are expressed by the same chemical formula, they differ greatly from each other in actual properties.

In this invention, a metal oxide such as mentioned above is coated on such characteristic surfaces of particles of synthetic MIO. A suitable process for the preparation of such coated synthetic MIO comprises adding a suitable amount of synthetic MIO in a solution of a compound which can readily be converted to a metal oxide (including hydrated metal oxide) by hydrolysis, such as titanium tetrachloride, titanyl sulfate and zirconium sulfate, heating the mixture at a suitable temperature under agitation and thus conducting the hydrolysis reaction for a certain period of time. The hydrolysis conditions vary to some extent depending on the metal compound to be hydrolyzed. In case titanyl sulfate is used, if the hydrolysis is effected at 70°–100°C. for 0.5 to 3 hours, a prescribed amount of the metal oxide is generally coated on the surface of synthetic MIO.

After completion of the hydrolysis reaction, the supernatant liquor is removed, and water is added to the residue to adjust the pH, following which the water-washing, filtration and drying are conducted according to customary procedures. The pH of the washing liquor used for washing the residue left after removal of the supernatant liquor is adjusted appropriately within a range of from 6 to 8. The drying of the solids left after filtration is preferably conducted at about 100°C. In order to obtain a product of excellent light resistance and luster, the so dried product is sometimes calcined appropriately. At an optional stage from the pH-adjusting step to the calcining step, it is possible to conduct the treatment with a solution containing an aluminium compound and thereafter heat treating the pigment, whereby an alumina coated product in which the metal oxide coating is further fastened by the alumina coating and the light resistance is further improved, can be obtained.

In the so obtained coated MIO product, the content of the coating-forming metal oxide (including a hydrated metal) having a high refractive index is 0.1 to 30% by weight, preferably 0.3 to 30% by weight, especially preferably 2 to 25% by weight, based on synthetic MIO. However, the amount of the metal oxide coating actually applied varies depending on the particle size of synthetic MIO, and in general, the greater is the particle size, the smaller is the amount of the metal oxide coating. The relation between the particle size of synthetic MIO and the preferable amount of the coating found as a result of our research works is illustrated in Table 1 given below.

Table 1

| Particle Size ($\mu$) | Amount of Coating (% by weight based on synthetic MIO) |
|---|---|
| 1 – 2 | 5 – 30 |
| 2 – 5 | 3 – 20 |
| 5 – 20 | 2 – 18 |
| 10 – 20 | 1 – 15 |
| 20 – 35 | 0.5 – 10 |
| 35 – 100 | 0.3 – 10 |

The so obtained synthetic MIO coated with the metal oxide, e.g., titanium dioxide, has improved surface characteristics and exhibits a clear color. Thus, the so obtained product is a colored substance, which will be referred to as "colored MIO" hereinafter.

Effects of improving the surface characteristics in particles of colored MIO of this invention will now be described. The first improvement resides in that chemical properties of the particle surface of colored MIO are greatly modified over starting synthetic MIO. For instance, when colored MIO is dipped in hydrochloric acid, sulfuric acid, nitric acid, oxalic acid, etc. at various acid concentrations, colored MIO exhibits a higher acid resistance than starting synthetic MIO and the acid resistance of colored MIO is comparable to that of titanium dioxide. This is seemed to be due to the fact that titanium dioxide is coated completely on the particle surface and hence, the surface properties of colored MIO particles are substantially the same as those of titanium dioxide. This has actually been confirmed by the observation of the particle surface under a scanning electron microscope.

The second improvement in the surface characteristics of colored MIO resides in that when used as a pigment in a paint, the pigmentary properites are greatly improved. It has frequently been pointed out that starting synthetic MIO involves problems of wetting with a binder and adhesion of a coating film when it is used in a paint. As a result of tests made on pigments of colored MIO obtained with this invention, it has been confirmed that these problems are completely solved and other various pigmentary properties are highly improved.

The third improvement resides in the color tone. More specifically, the color tone of colored MIO is one composed of a specific luster inherent of starting synthetic MIO and, mingled therewith, a clear color varying depending on the thickness of the coating of titanium dioxide. Examples of said colors are gold, violet, blue and green. The gravity and elegancy of the color tone of colored MIO are quite unique. According to experiments, the mechanism of coloration in colored MIO can be almost explained by interference of lights. More specifically, with the increase of the thickness of a transparent coating layer of a metal oxide such as titanium dioxde formed on the surface of synthetic MIO, the color changes continuously in an order of gold, violet, blue and green, and this change is repeated periodically.

Figure 2:
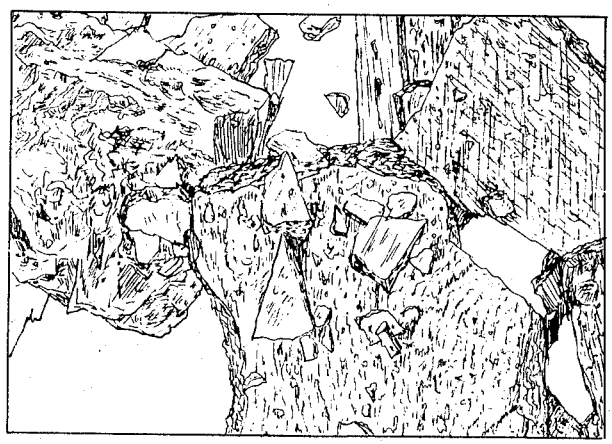
FIG. 2 is a photograph of natural MIO taken under a scanning electron microscope (magnification 1000 x)

However, the interference color of colored MIO obtained in this invention is very peculiar, and it is apparent that its surprising gravity and elegance are owing to characteristics inherent of starting synthetic MIO. The first characteristic of synthetic MIO giving such specific interference color to colored MIO is considered to be the excellent smoothness of the plate-like surface of the synthetic MIO particle. The smoothness of the surface of a substrate on which a metal oxide or hydrated metal oxide having a high refractive index is uniformly coated plays a very important role in the case of a pigment of an interference color such as colored MIO of this invention. Rays reflected from an optical plane such as the surface of the synthetic MIO particle advance in the same direction if the angle of incidence is the same, and the wavelengths causing the interference are limited to those meeting the principle of interference. As a result, the manifested interference color is one having high purity and high clearness. In contrast, in case the smoothness of the substrate surface is insufficient, scattering rays are formed depending on the roughness or unevenness of the substrate surface. Such scattering rays should naturally deprive the interference color of clearness, resulting in degradation of the color tone. Although natural MIO is chemically identical with synthetic MIO, since it is obtained by pulverizing a naturally occurring ore, the surface smoothness of natural MIO is inferior as is apparent from FIG. 2. Of course, natural MIO has a metallic luster resembling that of synthetic MIO even if the surface conditions of natural MIO are as shown in FIG. 2, but when a coating of titanium dioxide is formed on natural MIO, only a turbid, faint interference color is manifested and a clear color tone such as appears in the case of synthetic MIO cannot be obtained at all.

Figure 3:
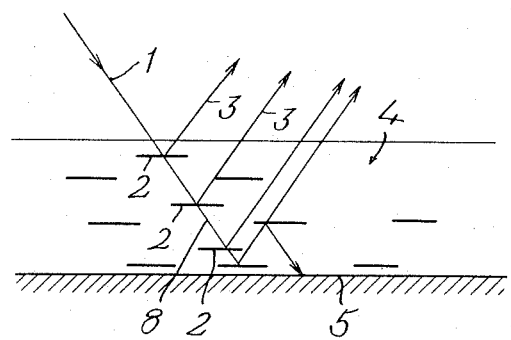
FIG. 3 is a view illustrating the state of multiple reflection in a pearly pigment.

Either the fact that single crystal particles of synthetic MIO have a property of readily reflecting rays because of a very high refractive index ($n = 3.0$), or the fact that they are substantially opaque though they allow only very slight transmission of visible rays of a long-wavelength region, cannot be overlooked when the causes for manifestation of a clear interference color, are sought for. In case the substrate is transparent or light-transmitting, a uniform coating of a substance of a high refractive index causes not only manifestation of an interference color but also manifestation of a so-called pearly luster. More specifically, as is illustrated in FIG. 3, many of incident rays 1 permeate 8 the pigment flake 2 in a layer 4 formed on the surface of the base 5 to cause multiplic reflection 3, resulting in manifestation of the pearly luster. In this case, the interference color is usually faint, and it is manifested for the first time only when the particles are expanded thinly by finger tips or arranged in parallel in a binder. Further, its hiding power is also weak. In contrast, in the case of colored MIO of this invention, since synthetic MIO substrate is substantially opaque, no multiple reflection is caused to occur but only a clear intereference color is manifested.

Figure 4:
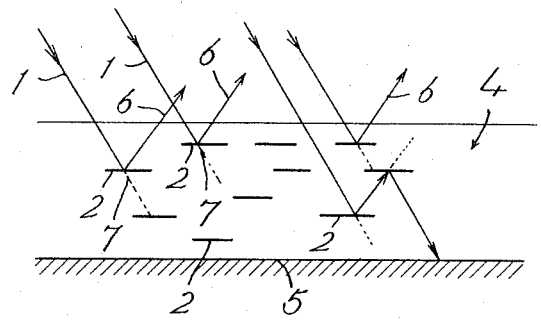
FIG. 4 is a view illustrating the state of reflection in colored MIO of this invention.

The above feature will now be illustrated in more details by reference to FIG. 4. In the case of colored MIO, incident rays 1 are reflected 6 by colored MIO or absorbed 7, and rays 8 permeating the pigment flake which are characteristically prominent in the case of a pearly pigment shown in FIG. 3, are as slight as can be substantially neglected. Accordingly, even if particles of colored MIO are arranged in parallel, no pearly luster is manifested but only a clear intereference color is manifested.

Still further, since the particle size of starting synthetic MIO is excellent in uniformity, a uniform luster can be imparted to colored MIO and it is apparent that the uniformity in the particle size of starting synthetic MIO is helpful to manifestation of an elegant and beautiful color tone.

As is apparent from the foregoing description, synthetic MIO can be converted to a useful coloring material according to this invention. In case the product of this invention is employed as a pigment, the light resistance and other properties must be taken into consideration. In general, in view of the principle of coloration, the color change in pigments of intereference colors correspond with the damage of a layer of a high refractive index formed on the surface of the substrate or the change in the thickness of such layer. Therefore, it cannot be deemed that the resistance would differ depending on the kind of the color but it is deemed that the light resistance is equal with respect to all colors. In the case of colored MIO of this invention, since the coating layer of a high refractive index is composed of a chemically inactive and stable substance such as titanium dioxide, colored MIO undergoes no substantial chemical change nor substantial color change. Results of our experiments indicate that the light resistance of colored MIO of this invention is very excellent and that colored MIO in which the layer of a metal oxide of a high refractive index is fastened by alumina, silica or the like, excels greatly ordinary organic and inorganic pigments in light resistance, and no substantial color change is observed in it. Thus, colored MIO has not only the above-mentioned improved particle surface characteristics but also excellent pigmentary properties.

This invention will now be illustrated in more details by reference to non-limitative Examples.

Example 1

300 g of synthetic MIO having an average particle size of about 15 $\mu$ was added to 1.5 l of a sulfuric acid-acidified aqueous solution containing 100g of titanyl sulfate $Ti(SO_4)_2 \cdot 9H_2O$ (30 g as calculated as $TiO_2$), and the mixture was heated at 95°– 100°C for 60 minutes under vigorous agitation. After the reaction mixture was cooled, the supernatant liquor was removed by decantation, and about 2 l of water was added to the residue. An aqueous solution containing sodium hydroxide at a concentration of 1 mole per liter was added to this washing liquor to effect the neutralization and the water washing was repeated until no sulfuric radical was detected in the washing liquor. According to customary methods, the solids were collected by filtration and dried at 100°C to obtain glistening powder of a blue color (sample (a) in Tables 2 and 3). In order to improve weatherability and luster, the so dried product was subjected to the following post treatments.

The product obtained by conducting the drying at 100°C was calcined at 600°C for 60 minutes to crystallize the titanium oxide coating film. Thus, glistening powder of a blue color with a relatively heightened luster was obtained (sample (b) in Tables 2 and 3).

300 g of the so calcined product was added to 1.5 l of an aqueous solution containing 18.0g of aluminum sulfate $(Al_2(SO_4)_3 \cdot 18H_2O)$ (2.8 g as calculated as $Al_2O_3$) and 9.0 g of sodium acetate $(CH_3COONa \cdot 3H_2O)$, and the mixture was heated at 95°–100°C. for 30 minutes under vigorous agitation. After the reaction mixture was cooled, the neutralization was effected with use of an aqueous solution containing sodium carbonate at a concentration of 1 mole per liter and the water washing was repeated until no sulfuric acid radical was detected in the washing liquor. The resulting solids were dried at 100°C to obtain glistening powder of a greenish blue luster (sample (c) in Tables 2 and 3).

The color tone was determined by a color-difference meter with respect to each of these products (a), (b) and (c), namely 100°C-dired product, 600°C calcined product and aluminacoated product; results are shown in Table 2.

Table 2

| Sample | l Value | a value | b value |
|---|---|---|---|
| Starting synthetic MIO | 28.0 | +2.0 | +0.9 |
| sample (a) (100°C dried product; $TiO_2$ content = 9.0% | 20.5 | −1.6 | −4.1 |
| sample (b) (600°C -calcined product; $TiO_2$ content = 9.0%) | 21.3 | −2.0 | −1.7 |
| sample (c) (600°C -calcined and alumina-coated product; $TiO_2$ content = 9.0%) | 24.3 | −3.7 | +1.1 |

The above products (a), (b) and (c) and untreated synthetic MIO were formed into paints under the following conditions, and they were coated on a tin-plate sheet.

Paint Composition

Beckosol 1307 (soybean oil-modified alkyd resin) (calculated as solids)   7 parts -Continued Paint Composition
Super-Beckamine J- 20 (melamine resin)  3 parts
Product (a), (b) or (c) or untreated  10 parts
synthetic MIO
Baking Conditions
130°C., 30 minutes
Coating
Spray coating to form a coating layer of 50 μ thickness on tin-plate sheet.

With respect to each of the so obtained coated sheets, 11 breaks were formed on the sheet at intervals of 1 mm on both the longitudinal and lateral direction by means of an edge of a safety razor, and a scotch tape was applied under pressure to the broken portion, followed by peeling.

The degree of peeling was determined according to the method of Paint Examination Association of Japan to obtain results shown in Table 3.

Table 3

| Sample | Test 1 | Test 2 | Average |
|---|---|---|---|
| starting synthetic MIO | 0 | 0 | 0 |
| sample (a) | 10 | 10 | 10 |
| sample (b) | 8 | 10 | 9 |
| sample (c) | 6 | 4 | 5 |

Example 2

The hydrolysis reaction was carred out in the same manner as in Example 1 with use of 40 g of titanyl sulfate $Ti(SO_4)_2 \cdot 9H_2O$ (11.8 g as calculated as $TiO_2$) and 400 g of synthetic MIO having an average particle size of 33 μ. After the water washing was conducted in the same manner as in Example 1, the solids were dried at 100°C to obtain powder of a violet luster (sample (d) in Tables 4 and 5). When this dried product was cal- Table 4

| Sample | I value | a value | b value |
|---|---|---|---|
| starting synthetic MIO | 27.1 | 0 | −0.5 |
| sample (d) (100°C dried product; $TiO_2$ content = 2.9%) | 11.4 | +5.5 | −8.1 |
| sample (e) (600°C calcined product; $TiO_2$ content = 2.9%) | 14.5 | +4.0 | +2.5 |
| sample (f) (660°C calcined and aluminate coated product; $TiO_2$ content = 2.9%) | 14.2 | ±4.0 | ±1.7 | cined at 600°C for 60 minutes, powder of a reddish violet luster was obtained (sample (e) in Tables 4 and 5). When an aluminum coating was formed on this calcined product (10% $Al_2O_3$ based on $TiO_2$), powder of a reddish purple luster was obtained (sample (f) in Tables 4 and 5).

Color tones of these products were determined by means of a color-difference meter to obtain results shown in Table 4.

The adhesion characteristics of these products were determined by the same method as described in Example 1 to obtain results shown in Table 5.

Table 5

| Sample | Test 1 | Test 2 | Average |
|---|---|---|---|
| starting synthetic MIO | 0 | 2 | 1 |
| sample (d) | 2 | 4 | 3 |
| sample (e) | 6 | 10 | 8 |
| sample (f) | 8 | 8 | 8 |

Example 3

5.00 Kg of synthetic MIO having an average particle size of 25 μ was suspended in 35 l of water, and the suspension was heated to about 50°C. Then, 2.10 Kg of crystals of titanyl sulfate (677 g as calculated as $TiO_2$) were added to the suspension and dissolved therein, following which the temperature was raised to 100°C over a period of about 1 hour by heating. The reaction was conducted under agitation at 100°C for 1 hour, and then, the agitation was stopped and the mixture was allowed to stand still. The supernatant liquor was removed and 40 l of water was added to the residue, following which the mixture was agitated for 5 minutes. At this stage, the pH was about 2. Then, a 10% aqueous solution of sodium aluminate was added dropwise to the mixture to adjust the pH to 3.5 – 4.0, and the mixture was heated at 80°C. for 5 minutes. After the pH was adjusted to 6.0 – 7.0 by dropwise addition of a 10% aqueous solution of NaOH, the water washing, filtration and drying (100°C) were carried out according to customary procedures, to obtain a product of a clear green color tinged with a gold luster. When this product was calcined at 400°C for 1 hour, 5.35 Kg of a product of a clear green color having improved light resistance and increased luster was obtained.

Example 4

The procedures of Example 3 were repeated by employing 5.00 kg of synthetic MIO having an average particle size of 25 μ, 35 l of water and 1.80 Kg of titanyl sulfate to obtain 5.20 Kg of a product having a clear blue color.

Example 5

The acid resistance of colored synthetic MIO obtained in Example 3 was tested to obtain results shown in Table 6. The dipping of the sample in an acid was conducted at 40°C for 24 hours.

Table 6

| Acid | Concentration (%) | Acid Resistance | |
|---|---|---|---|
| | | Colored Synthetic MIO | Starting Synthetic MIO |
| Sulfuric acid | 1.0 | − | − |
| Sulfuric acid | 0.1 | − | − |
| sulfuric acid | 0.01 | − | − |
| nitric acid | 1.0 | − | − |
| nitric acid | 0.1 | − | − |
| nitric acid | 0.01 | − | − |
| hydrochloric acid | 1.0 | − | − |
| hydrochloric acid | 0.1 | − | − |
| hydrochloric acid | 0.01 | − | − |
| acetic acid | 1.0 | − | − |
| acetic acid | 0.1 | − | − |
| acetic acid | 0.01 | − | − |
| Oxalic acid | 0.5 | − | ++ |
| oxalic acid | 0.1 | − | + |
| oxalic acid | 0.01 | − | − |

−: no change was observed.
+: acid solution was colored very slightly
++ acid solution was colored in a faint yellow color.

Example 6

Products obtained in Examples 3 and 4 and starting synthetic MIO were formed into paints under the following conditions and coated on a mild steel sheet.

Paint Composition

| | |
|---|---|
| Lustrasol A-405 (acrylic varnish) | 6 g |
| Super - Beckamine J-820 (melamine varnish) | 24 g |
| Colored MIO or starting MIO | 60 g |

Baking Conditions

130°C, 30 minutes

Coating

Spray coating to form a coating of 50 $\mu$ thickness on a mild steel sheet; Results of measurements of color tones of starting powders and the resulting coatings by a color-difference meter are shown in Table 7.

Table 7

| Sample | L value | a value | b value |
|---|---|---|---|
| colored powder obtained in Example 3 | 18.4 | −.5° | 1.9 |
| coating formed with use of colored powder obtained in Example 3 | 13.4 | −2.3 | 1.4 |
| colored powder obtained in Example 4 | 14.5 | −1.0 | −9.1 |
| coating formed with use of colored | 11.4 | 0 | −4.1 |

With respect to each of the so obtained coated mild steel sheets, 11 breaks were formed on the sheet at an interval of 11 mm in both the longitudinal and lateral direction, and a Scotch tape was applied on the broken portion under pressure, followed by peeling. The degree of peeling was determined according to the method of Paint Examination Association of Japan to obtain results shown in Table 8.

Table 8

| Sample | Test 1 | Test 2 | Average |
|---|---|---|---|
| coating of product obtained in Example 3 | 10 | 10 | 10 |
| coating of product obtained in Example 4 | 10 | 10 | 10 |
| coating of starting synthetic MIO | 6 | 8 | 7 |

Example 7

81 g of titanium tetrachloride ($TiCl_4$) was dissolved in 2.0 l of water, and 500 g of synthetic MIO having an average particle size of 30 $\mu$ was added to the solution. The mixture was heated at 95°–100°C under vigorous agitation for 60 minutes.

After the reaction mixture was cooled, the supernatant liquor was removed and about 2.0 l of water was added to the residue. Then, neutralization was effected by addition of an aqueous solution containing sodium hydroxide at a concentration of 1 mole per liter, and the water washing was repeated until no chlorine ion was detected in the washing liquor, followed by filtration and drying (100°C). Thus, glistening powder having a greenish brown luster was obtained.

Example 8

200 g of synthetic MIO having an average particle size of 30 $\mu$ was added to 1 l of an aqueous solution containing 35 g of zirconium sulfate ($Zr(SO_4)_2 \cdot 4H_2O$) and the pH of the mixture was adjusted to 2.7 – 2.9. The solution was heated at 90°C for 60 minutes, and the water washing, filtration and drying were carried out according to customary procedures. The dried product was calcined at 600°C for 60 minutes to obtain glistening powder having a gold luster.

Example 9

Procedures of Example 3 were repeated with use of 30 g of titanyl sulfate (8.9 g as calculated as $TiO_2$) 300 g of natural MIO and 2.0 l of water to obtain glistening powder having a sky-blue color luster.

What we claim is:

1. An iron oxide pigment consisting essentially of plate-like iron oxide particles having a smooth surface and a metallic luster, said surface being covered with a high refractive index transparent coating selected from titanium dioxide, hydrated titanium dioxide, zirconium dioxide and hydrated zirconium dioxide.

2. An iron oxide pigment as set forth in claim 1 wherein the plate-like particles are particles of synthetic micaceous iron oxide having a particle size ranging from 1 to 100 $\mu$.

3. An iron oxide pigment as set forth in claim 1 wherein the amount of the coating is 0.1 to 30% by weight based on the iron oxide particles.

4. An iron oxide pigment as set forth in claim 3 wherein the amount of the coating is 0.3 to 30% by weight based on the iron oxide particles.

5. An iron oxide pigment as set forth in claim 4 wherein the amount of the coating is 5 to 25% by weight based on the iron oxide particles.

6. An iron oxide pigment as set forth in claim 1 wherein an alumina coating is applied on the transparent coating.

7. A process for preparing an iron oxide pigment which comprises adding plate-like iron oxide particles having a smooth surface and a metallic luster to an aqueous solution containing titanium or zirconium material; and thereafter heating said mixture with agitation to form the respective oxide or hydrated oxide of titanium or zirconium material by hydrolysis, which is 0.1% to 30% by weight based upon iron oxide, and coating the iron oxide therewith.

8. A process as set forth in claim 7 wherein said reaction mixture is allowed to stand after heating and agitation and to form a precipitate therein of plate-like iron oxide particles coated with said oxide or hydrated oxide; and then supernatant liquid is removed from the residue.

9. A process as set forth in claim 7 wherein the plate-like iron oxide particles are synthetic micaceous iron oxide particles which are coated with titanium dioxide.

10. A process as set forth in claim 8 wherein the pH of the reaction mixture is adjusted by the use of sodium aluminate and then the surface of plate-like iron oxide particles coated with said oxide or hydrated oxide is further coated with alumina by heating.

11. A process as set forth in claim 8 wherein said reaction mixture is neutralized with alkali, water is added, and the resulting coated plate-like iron oxide particles are washed, filtered and dried.

12. A process as set forth in claim 11 wherein said plate-like iron oxide particles obtained by filtration and drying are calcined at a temperature of 400° to 750°C.

* * * * *